April 5, 1966     C. W. WEILAND     3,244,247

GROUND EFFECT MODULAR PLATFORM SYSTEM

Filed Jan. 28, 1964     2 Sheets-Sheet 1

INVENTOR
CARL W. WEILAND

By Nelsson, Robbins & Anderson
ATTORNEYS

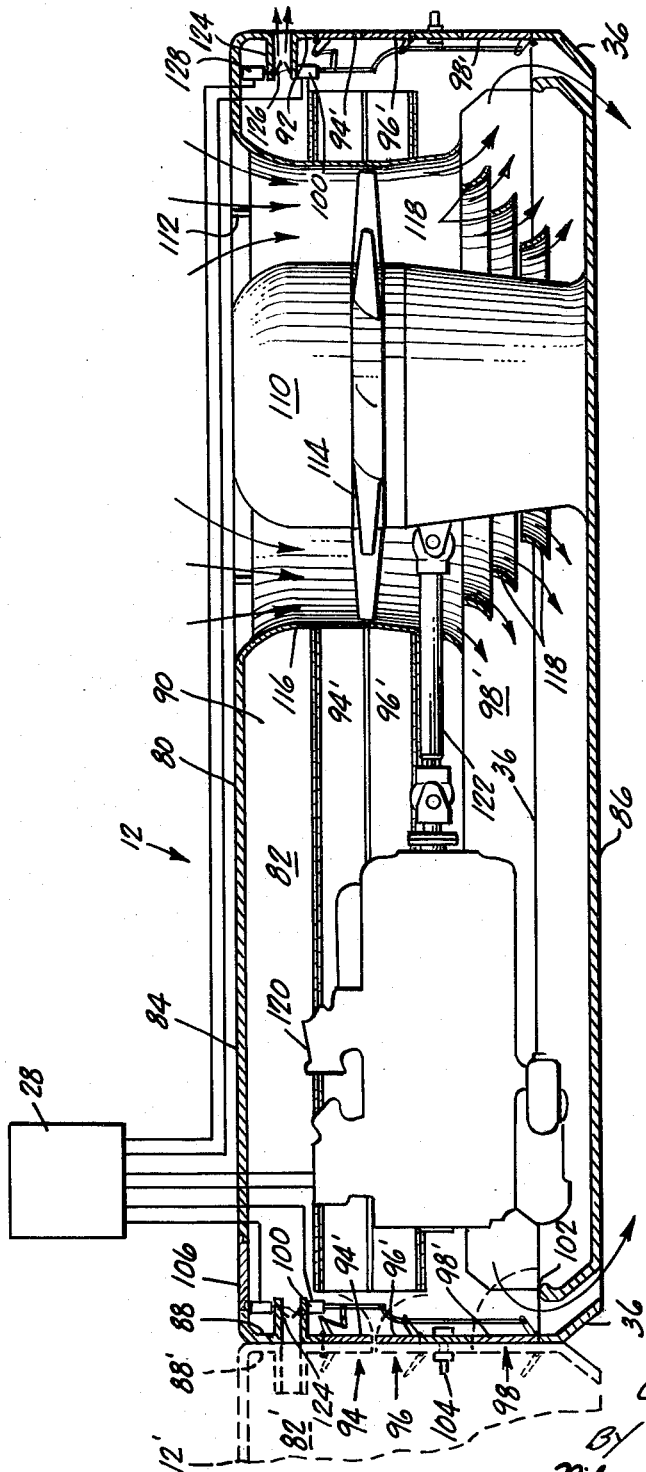

United States Patent Office 3,244,247
Patented Apr. 5, 1966

3,244,247
GROUND EFFECT MODULAR PLATFORM SYSTEM
Carl W. Weiland, Palos Verdes Estates, Calif., assignor to Douglas Aircraft Company, Inc., Santa Monica, Calif.
Filed Jan. 28, 1964, Ser. No. 340,614
4 Claims. (Cl. 180—7)

This invention relates generally to ground effect machines and more particularly to a general purpose airborne platform system for conveying material over nonsupporting soil or water or otherwise unprepared terrain.

Although the invention finds particularly useful application in conveying military or expeditionary aircraft over soft or marshy soil and although, for clarity and brevity, much of the discussion and examples set forth hereinbelow are directed toward such applications, the invention is not limited thereto. The invention as indicated above is a general purpose vehicle and has equal utilization whether in conveying heavy machinery over water as in tidelands or offshore industrial operations, for example, or in ferrying any material from one supporting soil or structure or long-range conveyance means to another.

The problem of airplane conveying as from a maintenance facility to a runway over unprepared soil or marshes at expeditionary or other minimum cost airfields, is a particularly severe one due to the high landing gear loading incumbent in modern aircraft. In order to provide taxiways or towing roadways for moving modern airplanes without conveyance devices, the land must be prepared to a considerable depth, depending upon soil and desired loading and the general environment of the locale, with consequent expenditures of time and money which are often prohibitive thereby resulting in the creation and maintenance of fewer emergency and other remote airfields than are desirable and would otherwise be feasible.

Previous attempts to solve the problem presented by the expense of providing adequate roadways or taxiways have typically been directed toward conveying dollies, commonly referred to as flotation devices (whether designed for land or water) which carry the aircraft from one prepared area to another and which have wheels, tracks, pontoons, skis or the like which effectively spread the load over a sufficient area of the unprepared terrain to achieve an adequate support. The most typical of such devices is a low profile trailer vehicle having a plurality of relatively broad, balloon type tires in supporting contact with the ground. A powered towing vehicle is then provided for moving the trailer over the unprepared ground. The success of such a system depends upon a correct and thorough study or mapping of the soil conditions of the terrain to be negotiated, and the subsequent proper selection or design of a flotation device adequate for the given load to be carried thereover.

Obviously such flotation devices are extremely limited as to the terrain they can negotiate under load. A device adequate for supporting a given maximum load over firm dry soil would be inadequate for the same load over marshy terrain. Similarly a flotation device adequate for the latter is normally inconveniently bulky and expensive for use on firm soil. Furthermore, devices of this general character have not been truly amphibious, so that if transport over water and land is required, two flotation vehicles of different types, and similarly two different towing vehicles are usually needed for the given transport task. In this connection note that the latter are similarly limited in their terrain negotiability and load capability.

All such devices are severely limited in the roughness of terrain that they and their payload can tolerate even when the ground is relatively firm.

It is further to be noted that prior art flotation trailers are very limited to the magnitude and types of loads they can be adapted to transport. For example, such a dolly designed for carrying a compact supersonic fighter aircraft would not be dimensionally suited for carrying a bomber or transport plane. Similarly the dolly, which is generally in the form of a horizontal skeletal A-frame for contacting the tricycle landing gear of the given plane, with minimum weight in the structure of the dolly, is not suitable for carrying other types of vehicles or material.

Accordingly it is obvious that in addition to the inherent limitations of the prior art flotation devices, they are expensive both intrinsically and because a plurality of them must be required at any particular airfield due to the nonversatility of the individual devices and their requirement for different types of towing vehicles. Storing and transporting of such vehicles also requires a relatively large expense.

An additional disadvantage of the prior art flotation dollies is that their supporting ability depends upon the massiveness of the frame structure and the width of the tires or other ground contacting rollers. Such systems including the towing vehicles cannot convey large loads in confined spaces, such as the holds or decks of freighter ships and planes. In the same regard such flotation vehicles generally are incapable of lateral movement due to their massive frames and suspension systems which further limit their usefulness generally as well as particularly in confined spaces.

Additional deficiencies and limitations exist inherently in flotation devices constructed in accordance with such prior art approaches. However they may be summarized with the observation that at best the loading to the ground is by direct contact over a relatively limited contact area. Some at least of the roughness of the terrain is communicated to the load; and, in addition to considerable rolling friction, there is danger of excessive sinking. Thin ice is not therefore negotiable by either the flotation device or its towing vehicle.

It is therefore an object of the present invention to provide a flotation platform system which is not subject to these and other disadvantages of the prior art.

It is another object to provide such a flotation system which utilizes a ground effect air cushion for noncontacting support over terrain or water.

It is another object to provide such a system which is exceedingly versatile in the character and magnitude of the loads which are carried thereby.

It is another object to provide such a system which does not require a towing vehicle.

It is another object to provide such a system which distributes its loading evenly over substantially its entire plan area and therefore does not depend for ground support upon massive frame members and huge tires.

It is another object to provide such a platform system which is self-propelled and can move over rough terrain laterally, longitudinally, or rotatively.

It is another object to provide such a system which can carry massive loads over unprepared soils and swamps, crops or other agricultural or industrially prepared land, water, thin ice, mud, or the like without the advance requirement of studying and analyzing the conditions or load supporting capability of the terrain desired to be traversed.

The features of the present invention which are believed to be novel and patentable are set forth in the claims which form a part of this specification and which define the scope of the invention. For a better understanding of the invention, however, reference is made to the following description of the accompanying drawings which are presented expressly by way of example only and in which:

FIGURE 4 is a longitudinal sectional view of the structure illustrated in FIGURE 1 taken along the lines 4—4 thereof.

Figure 1:
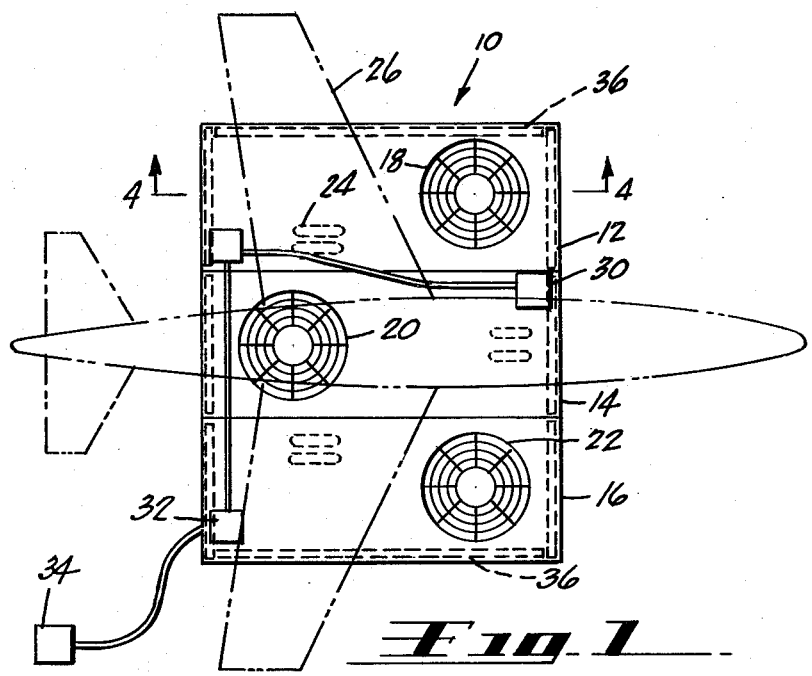
FIGURE 1 is a plan view of a modular ground effect flotation platform system constructed in accordance with the principles of the present invention.

Briefly, the above and other objects are achieved in one example of the invention which includes a modular ground effect platform comprising one or more modular platform units removably joined together to form an integrally combined platform. Each of the units includes a load supporting horizontal deck. Below this deck a plenum is formed between the deck, the vertical walls disposed peripherally about the unit, and a lower enclosing, horizontal panel. Disposed within the plenum is an engine and a large volume fan oriented with its axis vertical. The upper deck is ported or foraminated as by a load supporting grate above and in line with the fan whereby rotary actuation of the fan draws air downwardly through the grate into the plenum.

The lower panel is ported substantially continuously about its periphery to form a substantially downwardly directed duct for the escape of the pressurized air in the plenum into a ground effect, supporting cushion of air beneath the platform between the lower panel and the ground or other terrestial surface. In addition to directing the supporting air predominantly downwardly, the ducts are adapted to direct the air somewhat inwardly toward the center of the machine. Thusly, the efficiency of the supporting air cushion is increased without peripheral skirts which would increase the overall vertical thickness of the platform and would have to be structurally complex in order to provide support for the loaded machine when the engine was not in operation.

The vertical walls of the unit are also ported as by horizontally elongated louvre type adjustable ports. When two of the modular units are bolted or otherwise clamped together along one edge, the ports in the joined walls are fully opened and the downwardly directed ducts in the bottom panels of both along that wall are closed. Thus even though a plurality of the modular units are joined, the air cushion is fed from only around the resultant periphery of the integral platform. In addition the plenums of the different modular units are effectively joined thusly to form one large plenum which is cooperatively pressurized by the engines of each of the individual units.

Thusly a unitary flotation platform may be assembled to have, within wide limits, any desired size, shape or total lifting ability. The total magnitude of the lift is controlled by the angular velocity of the engines and fans, the controls of which are preferably ganged together and operated from a single remote position.

Once borne on its supporting air cushion the flotation platform can be moved or rotated in any horizontal direction by the application of small forces as by hand or by laterally directed propulsion jets which are also controlled from the single control position.

With further reference now to the figures in detail, it is stressed that the particulars shown are by way of example and for purposes of illustrative discussion only and are presented in the cause of providing what is believed to be the most useful and readily understood description of the principles and structural concepts of this invention. In this regard no attempt is made to show structural details of the apparatus in more detail then is necessary for a fundamental understanding of the invention, the description taken with the drawings making apparent to those skilled in the art how the several forms of the invention may be embodied in practice. In particular the detailed showing, as indicated above, is not to be taken as a limitation upon the scope of the invention which is defined by the appended claims forming along with the drawings, a part of this specification.

In the plan view of FIGURE 1 a ground effect flotation platform system 10 is shown as including a combination of three substantially identical flotation platform modular units 12, 14, 16. The top surface of the combined platform system is substantially horizontal and flat for purposes of achieving versatility in the type and character of material which may be loaded thereon. Each of the units includes a large area air intake duct 18, 20, 22, respectively, which may be covered and protected by a rugged, load supporting grate, as shown, the top surface of which is coplanar with that of the remaining top surface of the platform system. In the examples shown the duct 20 is disposed laterally in a direction opposite from that of the ducts 18, 22 on the outboard units for purposes of symmetry in balance as well as in this example to provide solid deck areas for the placement of the tricycle landing gear 24 of the payload aircraft 26 shown in the figure in phantom lines.

Each of the flotation modular units includes an internally housed engine and fan driven thereby, which are controlled by mechanical or electromechanical linkages from a control box 28, 30, 32. Each of these boxes may be controlled separately or, as shown, they may be electrically ganged together and controlled from a remote master control box 34. A more detailed discussion of the control functions to be achieved in the operation of the flotation platform system shown will be presented below. Suffice it to note here that the magnitude of lift effect to be achieved by each of the modular units and, consequently, by the combined system is a function of the magnitude of current of air drawn into the ducts 18, 20, 22 which is in turn controlled directly by the rotational velocity of the engine, not shown, which drives the fan.

Also shown in FIGURE 1, in dotted lines, are the ground effect producing output ducts 36 which in a manner to be described more fully below extend about substantially the entire periphery of the combined flotation platform system.

Figure 2:
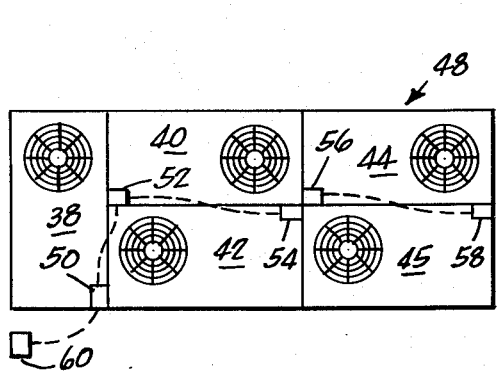
FIGURE 2 and FIGURE 3 are plan views similar to that of FIGURE 1 and which illustrate alternative configurations for assembling the modular units into an integral system.

Referring to FIGURE 2 an example of the invention is illustrated schematically in which a plurality of five flotation platform modular units 38, 40, 42, 44, 45, are secured together to form a combined flotation platform system 48. In this example, as in that shown in FIGURE 1, the control boxes 50, 52, 54, 56, 58, of the individual modular units are linked together, as shown, and all are coupled to a remote operator's control box 60. This particular configuration of assembly of the plurality of modular units is particularly useful in the transportation of large trucks or other elongated vehicles or elongate construction materials or the like.

Figure 3:
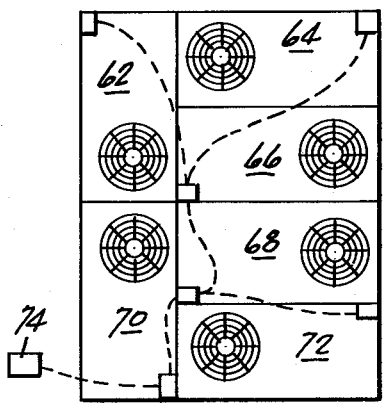

The example of the invention shown in FIGURE 3 again illustrates schematically the great magnitude of versatility of a combined ground effect flotation platform system built up modularly from a plurality of individual units, 62, 64, 66, 68, 70, 72. Again the individual control boxes for each of the modular units are coupled together and to a remote operator's control box 74.

Referring to FIGURE 4 the flotation platform modular unit 12 is shown in longitudinal section. The platform unit includes an overall housing body 80 the interior volume of which, in this example, defines an air reservoir plenum 82 and includes a top loading deck 84 and a lower enclosing panel 86.

These upper and lower members are structurally interconnected by vertical wall members 88, 90, 92. An elongate output duct 36 is interposed between the lower edge of each of the vertical wall members and the outer perimeter of the lower enclosing panel 86. The output ducts thusly, as seen in FIGURE 1, extend around substantially the entire perimeter of the modular unit 12.

Each of the vertical wall members are in this example ported to define elongated plenum tie-in openings 94, 96, 98, which are each closable by an elongated louvre-type valve 94', respectively, which are each hinged as shown from the respective vertical wall members having the tie-in openings therein as indicated above. These louvre-type valves all open inwardly in response to an electrical solenoid to which they are each mechanically linked as shown. It may be noted that when the louvre-type valve 98' is opened as shown by the dotted lines in the figure, it lies across the opening 102 of an associated output duct 36.

In this manner of opening the tie-in openings 94, 96, 98, while at the same time closing the associated portion of the output ducts 36, the platform modular unit 12 may be secured as by a bolt 104 to the like vertical wall member 88' of an adjacent unit 12' shown in the figure in dotted lines. When the indicated bolting together is accomplished by means of a removable hatch cover 106 which may be mounted flush in the top surface of the upper loading deck 84, and when the tie-in openings are opened, in this example, by an electrical signal from the control box 28, the air reservoir plenum 82 is effectively extended and becomes for all essential purposes an integral part of the air reservoir plenum 82' of the adjacent modular unit 12'.

It is therefore to be understood that when a plurality of the modular units are thusly secured together the openings 102 of the portions of the output ducts 36 which lie contiguously to the joined vertical wall members, e.g. 88, 88', are closed so that the only portions of the output ducts 36 which are open are those portions which lie about the resultant periphery of the combined ground effect flotation platform system.

It is also to be noted that the curtain shaped jet of air which is formed by the output ducts 36 are directed not only downwardly into the space below the platform unit 12, but also somewhat inwardly and away from the outer perimeter of the combined system. In this manner and because all of the internal ducts are closed, the efficiency of the platform is maximized because the inwardly directed flow of air must travel a maximum distance or change direction and therefore has a relatively high resistance with respect to escaping from the air cushion region below the platform system. A further advantage stemming from the closing of all the internal portions of the duct 36 is that the resultant air reservoir is effectively a very large plenum which is fed by a plurality of fan units which thereby cooperate to provide a relatively uniform pressure throughout the plenum whereby the output of each particular fan unit does not critically determine the magnitude of lift developed by its associated modular platform unit. It may therefore be considered that the overall integral plenum integrates all of the input effects and provides therefrom a fairly uniform output effect independently from the relative functions of the separate input means.

Referring now to the ground effect producing means in particular, a large volume fan 110 is mounted with a vertical axis within the housing body 80. Its input air is supplied through a load supporting grate 112, the top surface of which is substantially flush with that of the upper loading deck 84. The fan 110 includes a rotary impeller member 114. The fan and impeller unit are mounted within a large diameter input duct 116, the upper end of which terminates with the grate 112 and the lower end of which is flared outwardly and opens into the air reservoir plenum 82. A plurality of circular deflecting louvres 118 may be mounted concentrically about the axis of the fan 110 for purposes of minimizing the turbulence of the input air as it is exhausted into the plenum 82.

The fan 110 is operated, in this example, by an internal combustion engine 120, which is mounted and housed within the housing body 80. A universally jointed drive shaft 122 coupled the mechanical output of the engine 120 to the gear train not shown, of the fan 110. Electrical or electromechanical controls for the engine extend as shown schematically to the operator's control box 28. These controls in this case include starting, ignition, and throttle controls.

A lateral thrust producing jet 124 may be provided in each of the vertical wall members as shown for providing a laterally directed propulsion force for the platform system. The jet is opened and closed by a valve 126 which in this example is actuated by an electric solenoid 128 which in turn receives its energizing signals from the operator's control box 28. The air supply for the resulting propulsion jet when the valve 126 is opened is the pressurized plenum 82.

There have thus been disclosed a number of examples of a ground effect flotation platform system which achieves the objects and exhibits the advantages set forth hereinabove.

What is claimed is:

1. A modular ground effect platform system comprising:
   at least one fluid reservoir plenum unit each defined by a horizontally disposed loading deck, a lower enclosing panel spaced below said deck, substantially vertical, enclosing wall members disposed between said deck and panel about substantially their peripheries;
   fan and fan propulsion means disposed within the outer boundaries of each said at least one plenum unit for pressurizing it, and fan control means coupled to said fan means for affecting the magnitude of lift developed thereby,
   said lower enclosing panel being ported to define horizontally elongated downwardly directed, supporting cushion developing jet outputs disposed contiguously along said enclosing wall members,
   at least one of said wall members of each of said at least one plenum unit being ported to define an openable and closeable tie-in opening communicating from within said plenum unit through said one of said wall members;
   means for substantially coincidentally closing the said horizontally elongated jet outputs disposed contiguously along said at least one of said wall members while opening said tie-in opening; and
   means for securing rigidly said at least one wall member to a like wall member of an adjacent one of said plenum units;
   said means for closing and opening being structurally characterized by substantially coincidentally providing direct communication between said adjacent plenum units while closing those said elongated jet outputs which are disposed adjacently to the rigidly secured said one wall member and said like wall member, and, alternatively, by substantially coincidentally closing said tie-in opening in a predetermined one of said wall members while opening said elongated jet outputs disposed contiguously along said predetermined one of said wall members.

2. The invention according to claim 1 in which each said elongated jet output is of the character to provide a curtain stream directed downwardly and somewhat inwardly away from its respective associated said enclosing wall portion.

3. The invention according to claim 1 in which said quantity of at least one unit constitutes a plurality of said plenum units substantially, rigidly and cooperatively secured to each other along appropriate ones of said wall members and which further includes combined remote lift control means coupled to said fan control means of each of said plenum units for controlling in unison the combined lift effect of said plurality of plenum units.

4. The invention according to claim 1 which further includes lateral propulsion means including output lateral air jet means carried by at least one of said wall members and comprising:
- a closeable fluid passageway communicating from within the pressurized plenum unit through its associated said wall member;
- controllable valve means carried by the plenum unit for selectively opening and closing said passageway; and
- means coupled to said valve means for controlling the magnitude of fluid current through said passageway.

References Cited by the Examiner
UNITED STATES PATENTS

| | | | |
|---|---|---|---|
| 3,045,951 | 7/1962 | Freeland | 180—7 X |
| 3,150,732 | 9/1964 | Walker | 180—7 X |
| 3,183,988 | 5/1965 | Jones | 180—7 X |

BENJAMIN HERSH, *Primary Examiner.*

M. S. SALES, *Assistant Examiner.*